Feb. 4, 1936.   A. L. DILLER ET AL   2,029,361
METHOD OF PRODUCING SURFACES OF COMMINUTED MATERIAL
Filed June 8, 1934   2 Sheets-Sheet 1
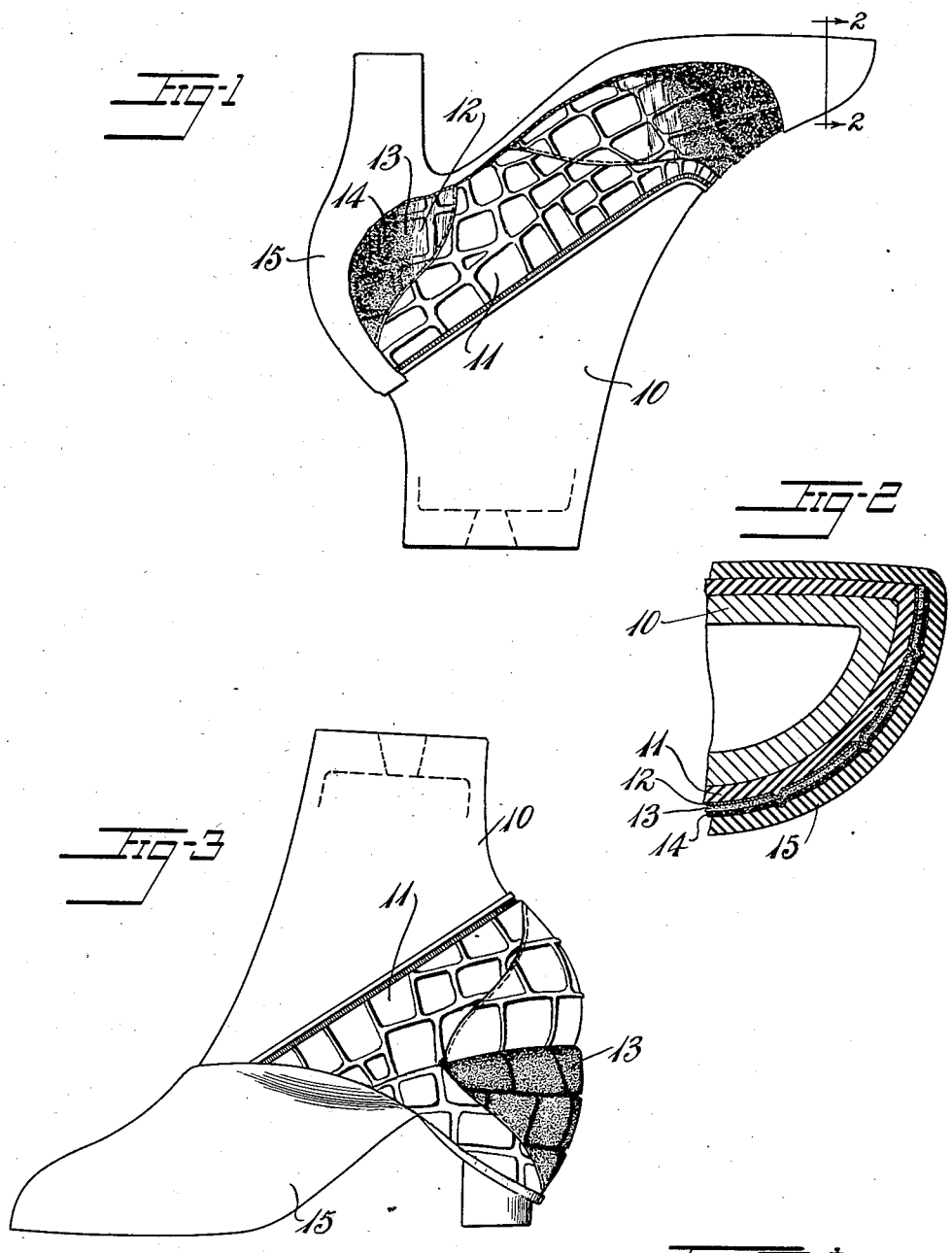
Inventors
Alvin L. Diller
Leslie H. L'Hollier
By Eakin & Avery
Attys.

Feb. 4, 1936. A. L. DILLER ET AL 2,029,361
METHOD OF PRODUCING SURFACES OF COMMINUTED MATERIAL
Filed June 8, 1934 2 Sheets-Sheet 2
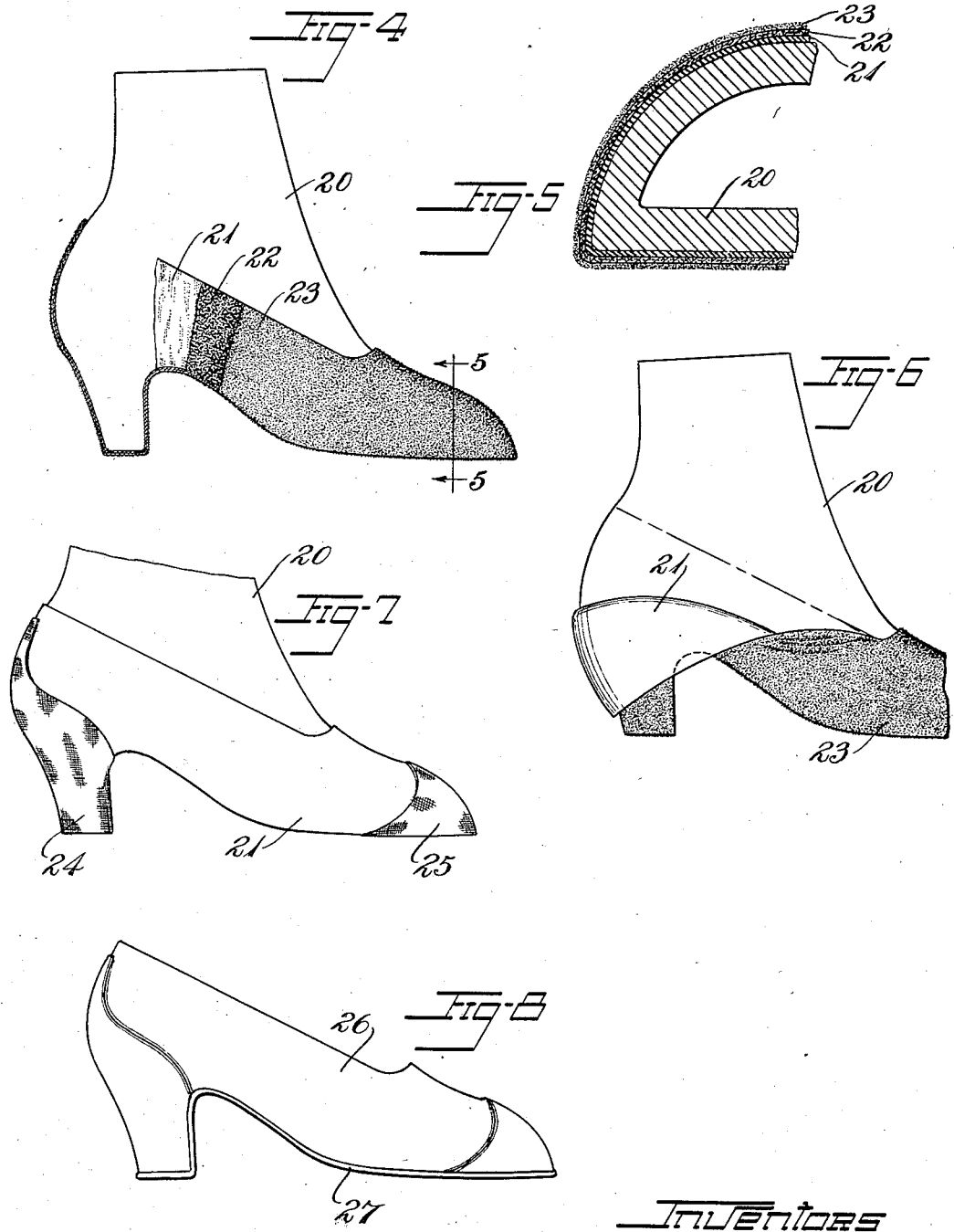

Patented Feb. 4, 1936

2,029,361

UNITED STATES PATENT OFFICE 2,029,361

METHOD OF PRODUCING SURFACES OF COMMINUTED MATERIAL

Alvin L. Diller, Belmont, and Leslie H. L'Hollier, Waltham, Mass., assignors to Hood Rubber Company, Inc., Watertown, Mass., a corporation of Delaware Application June 8, 1934, Serial No. 729,724

4 Claims. (Cl. 18—58)

This invention relates to the production of surfaces of comminuted material, especially contoured rubber articles, such as rubber footwear, having surfaces of flock or other comminuted material.

The chief objects of the invention are to provide improved procedure for conveniently producing surfaces of comminuted material, to provide for producing configured surfaces of comminuted material, and to provide for conveniently producing contoured rubber articles in which both the faces of comminuted material and the face opposite are neatly formed.

These and further objects will be apparent from the following description, reference being had to the accompanying drawings, in which:

Fig. 1 is an elevation, with parts broken away, of a matrix form having a rubber shoe formed thereon in accordance with the preferred procedure of the invention.

Fig. 2 is an enlarged section, with parts broken away, taken along the line 2—2 of Fig. 1.

Fig. 3 is an elevation of the matrix form of Fig. 1 with the rubber shoe partly stripped from it.

Fig. 4 is an elevation, with parts broken away and sectioned, of a form having a shoe body deposited thereon in accordance with a modified procedure of the invention.

Fig. 5 is a section on an enlarged scale, with parts broken away, taken along the line 5—5 of Fig. 4.

Figs. 6 and 7 are elevations of the form of Fig. 4 with a shoe body mounted upon it in accordance with successive steps of the modified procedure.

Fig. 8 is an elevation of the completed shoe made by the modified procedure.

In Fig. 1 a matrix shoe form is provided comprising a support 10 having mounted upon it a matrix material 11, preferably rubber, having molded or otherwise formed in its outer surface a negative reproduction of a chosen configured design, for example that of the surface of a reptile skin.

The invention makes possible the production of a rubber shoe having a surface of it molded to the surface design of the matrix and at the same time the provision of a layer of flock or other comminuted material upon the whole or portions only of the designed surface with the configuration appearing in such surface.

To this end a thin layer or film 12 of a substance suitable as a temporary adhesive for flock, preferably in liquid form, is deposited upon the matrix surface over the area or areas desired to be flocked. This may be done by painting or spraying the liquid upon the surface. Upon this is deposited, as by blowing, a layer 13 of flock or other comminuted material, which adheres only to the area of the form which has the liquid upon it. A thin layer 14 of liquid dispersed rubber, preferably a solvent dispersed rubber, is then applied to hold the flock without disturbing it, and then a further layer of rubber 15 is deposited thereupon in molded relation to it to provide the body of the article.

Preferably the adhesive liquid comprises a coagulant of rubber and the outer layer 15 is deposited from an aqueous dispersion of the rubber. It has been found that in such case the rubber of the layer 15 becomes coagulated apparently by migration of the coagulant through the layers 13 and 14 to the layer 15.

A liquid for this purpose which has given good results comprises, by weight, about 3% glycerine, about 22% coagulant for rubber, such as calcium nitrate or zinc chloride, and the remainder a volatile liquid such as acetone, alcohol, or both. This example is illustrative merely, and is not wholly limiting, as various other substances may in many cases be used to provide a temporary and weak adhesive for the comminuted material.

The layered structure of the shoe is then removed from the form as shown in Fig. 3, and preferably is mounted inside out upon a shaping support and vulcanized in open heat. If any residue to the substance 13 remains on the flocked surface it may be removed, as by washing or brushing. As shown in Fig. 3 the surface of comminuted material, as well as the rubber surface, has formed in it a positive reproduction of the surface design of the matrix.

In case it is desired to produce a shoe with a flock lining and a smooth rubber outer surface, the procedure above described may be followed, a smooth form being used, however, rather than the matrix form described above, and the article being vulcanized on that form without being turned inside out, so that the flocked face will remain on the inside of the shoe and the smooth rubber face will remain at the outside.

For this type of flocked shoe the modified procedure of Figs. 4 to 8 also is well adapted.

The modified procedure makes possible the production of a shoe with one face of flock and the opposite face of rubber with both faces unmolded although the shoe is formed by deposition upon a form. This is of advantage especially in cases where it is desired not to rely upon the form surface for providing the smooth surface as it is sometimes difficult to prevent scratching or otherwise marring the form surface in use.

In this modified procedure a layer 21 of rubber is deposited upon a form 20 by any suitable procedure, preferably by deposition from an aqueous dispersion of the rubber with the aid of a coagulating agent. Upon this is deposited a layer 22 of rubber cement or other substance suitable to adhere comminuted material permanently and upon this is applied a layer 23 of flock or other comminuted material.

After the rubber layers have at least partially dried the layered structure is stripped from the form, as shown in Fig. 6, and is mounted inside out upon the same or another similar form, as shown in Fig. 7.

Heel and toe reinforcements 24 and 25 may now be adhered to the surface of the layer 21, and an outer layer 26 (Fig. 8) of rubber superimposed upon it preferably by depositing from a liquid dispersion of the rubber. A sole 27 may also be added, and the shoe may then be vulcanized.

By this procedure any imperfections that may have been formed in the surface of layer 21, resulting from the deposition of the rubber of this layer directly upon the form surface, are hidden in the wall of the final article, of which both the inner flocked surface and the outer rubber surface may be provided neat and smooth.

Variations may be made without departing from the scope of the invention as it is defined in the following claims.

We claim:

1. The method of making a rubber article having a surface of comminuted material which comprises depositing upon a support a layer of adhesive liquid comprising a coagulant for rubber, depositing thereupon a layer of comminuted material, depositing upon the latter in adhesion therewith a layer of rubber at least a portion of which is coagulable, and removing the layered structure from the support.

2. The method of making a rubber article having a configured surface of comminuted material which comprises depositing upon a configured supporting surface a thin layer of substance adapted to coagulate a dispersion of rubber and temporarily to retain comminuted material, depositing thereupon a layer of comminuted material, depositing upon the latter in adhesion therewith a layer of rubber, and removing the layered structure to present its configured surface of comminuted material as a face of the article.

3. The method of making a contoured rubber article having a configured surface of comminuted material which comprises depositing upon a configured form a thin layer of substance adapted temporarily to retain comminuted material, depositing thereupon a layer of comminuted material, depositing upon the latter in adhesion therewith a layer of rubber, removing the layered structure and mounting it inside out upon a shaping support to present its configured surface of comminuted material as an outer face of the article, and vulcanizing the article.

4. A method as defined in claim 3 in which the thin layer of said substance is an adhesive liquid comprising a coagulant for rubber, and at least a portion of the rubber applied upon the comminuted material is coagulable.

ALVIN L. DILLER.
LESLIE H. L'HOLLIER.